June 24, 1958 — H. A. LILJENBERG — 2,840,271
SEED AND FERTILIZER SPREADER
Filed Sept. 7, 1956 — 3 Sheets-Sheet 2

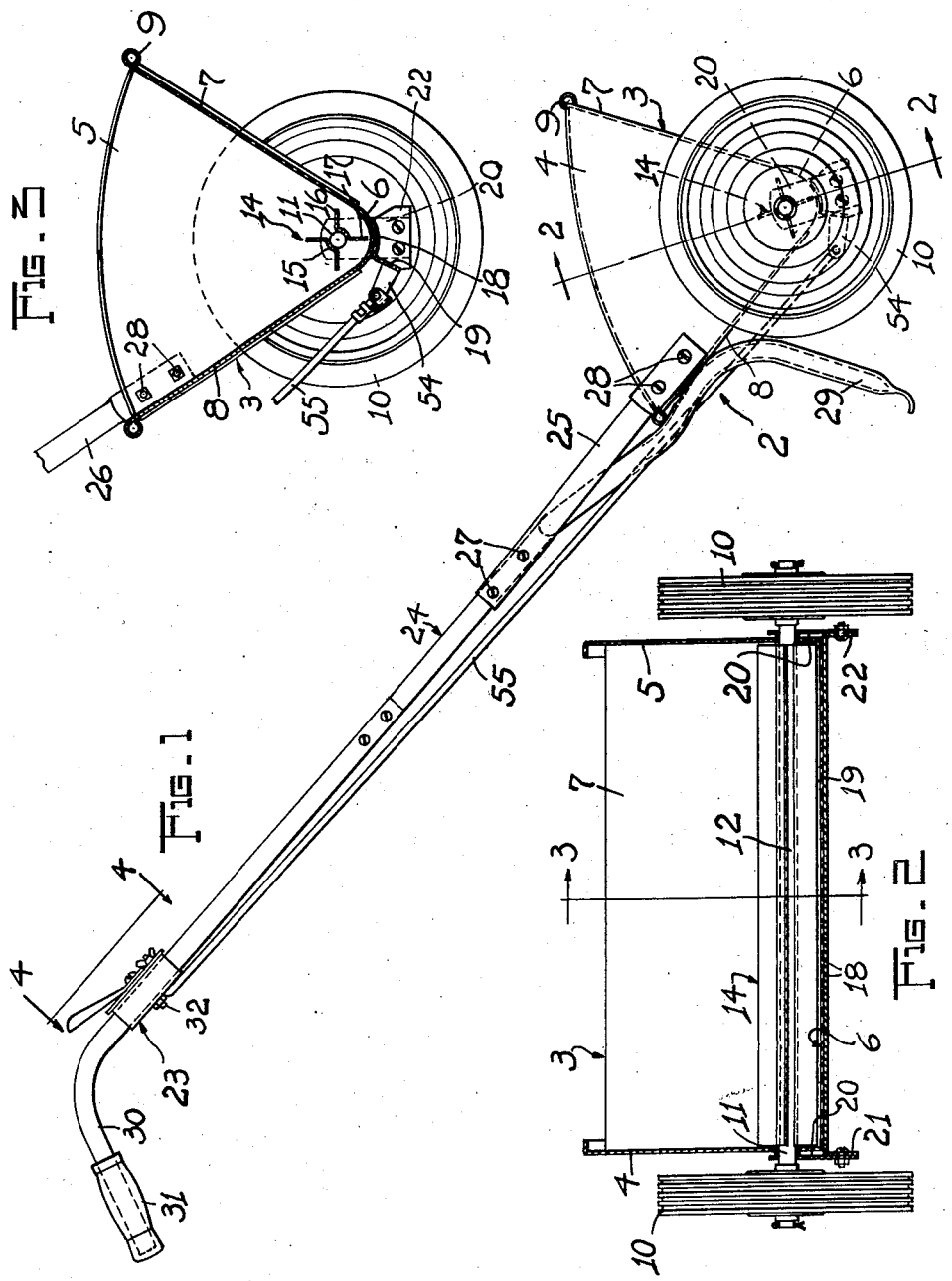

INVENTOR.
HARRY A. LILJENBERG
BY
Gustav A. Wolff
ATT.

June 24, 1958 H. A. LILJENBERG 2,840,271
SEED AND FERTILIZER SPREADER
Filed Sept. 7, 1956 3 Sheets-Sheet 3

INVENTOR.
HARRY A. LILJENBERG
BY
Gustav Q. Wolff
ATT.

United States Patent Office 2,840,271
Patented June 24, 1958

2,840,271

SEED AND FERTILIZER SPREADER

Harry A. Liljenberg, Cleveland, Ohio, assignor to Modern Tool & Die Company, Cleveland, Ohio, a corporation of Ohio Application September 7, 1956, Serial No. 608,544

3 Claims. (Cl. 222—41)

This invention relates to material spreading apparatus such as seed and fertilizer spreaders adapted to spread predetermined amounts of seed or fertilizer on lawns, gardens, etc., and has particular reference to actuating and adjusting mechanism for hand-operated spreaders.

Spreaders of this type embody elongated, generally agitated hoppers with material discharge openings arranged in the bottom walls thereof. These discharge openings are controlled by shiftable shutter means actuated by adjustable shifting mechanism which effects shifting of the shutter means between their closed and open positions to expose desired discharge areas of the discharge openings for proper control of the flow of fine and coarse materials from the hoppers of the spreaders.

The general object of this invention is the provision of a material spreading apparatus of the type referred to above with improved simple and economic control mechanism for the shiftable shutter means of the material spreading apparatus, the control mechanism embodying a manually actuated, pivotally supported shifting lever coupled with the shutter means and arrested in its shifting movements by stationary and adjustably supported members correlated to each other and the shifting lever by slotted portions of such members.

Another object of the invention is the provision of a material spreading apparatus having a shutter control mechanism embodying a stationary slotted supporting means supported by the material spreading apparatus, shiftable slotted adjusting means slidably engaged with the supporting means and associating its slotted portion to the slotted portion of the supporting means, and shifting lever means pivoted to the supporting means; the supporting means and the adjusting means being correlated by their slotted portions to the shifting lever means for adjustably limiting movements of the shifting lever means to adjustable predetermined distances.

With the above and other objects in view, the invention has certain other marked superiorities which clearly distinguish it from presently known structures and arrangements of this type. These improvements or characteristics embodying certain novel features of construction and design are clearly set forth in the appended claims, and the preferred embodiments of the invention as used in a hand-operated spreader are hereinafter shown with reference to the accompanying drawings forming part of the specification.

In the drawings:

Fig. 1 is a side view of a hand-operated spreader embodying the invention.

Fig. 2 is a sectional view taken on line 2—2 of Fig. 1.

Fig. 3 is a cross sectional view taken on line 3—3 of Fig. 2.

Fig. 12 is a plan view of the modified shutter control.

Fig. 13 is an end view of Fig. 12.

Fig. 14 is a side view of Fig. 12.

Fig. 15 is a perspective view of the shiftable adjusting plate; and

Fig. 16 is a perspective view of the base plate.

Figure 5:
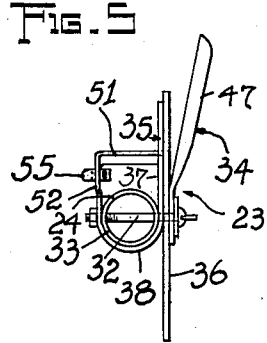
Fig. 5 is an end view of Fig. 4.
Figure 4:
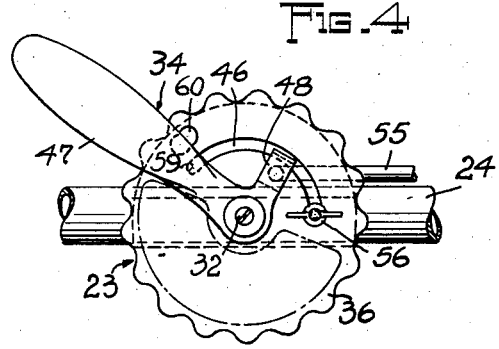
Fig. 4 is an enlarged plan view of the shutter control means, the view being taken from line 4—4 of Fig. 1.
Figure 6:
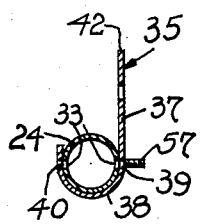
Fig. 6 is a sectional view taken on line 6—6 of Fig. 7.
Figure 7:
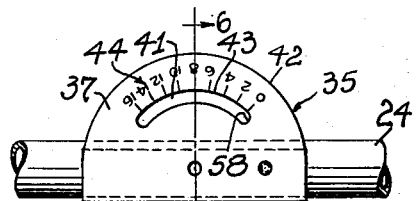
Fig. 7 is a plan view similar to Fig. 4, the shifting lever and adjusting disk being removed to show the base plate.
Figure 8:
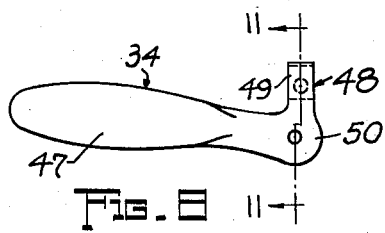
Fig. 8 is a plan view of the shifting lever.
Figure 9:
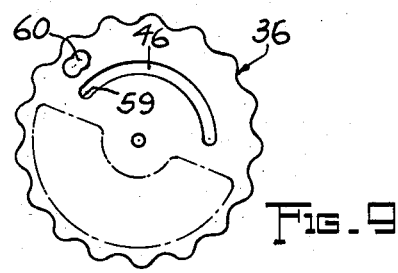
Fig. 9 is a plan view of the rotatable adjusting disk.
Figure 10:
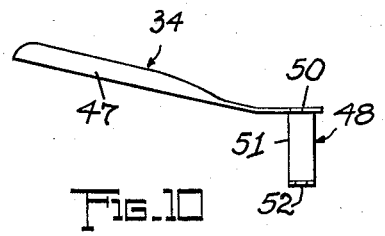
Fig. 10 is a side view of the shifting lever.
Figure 11:
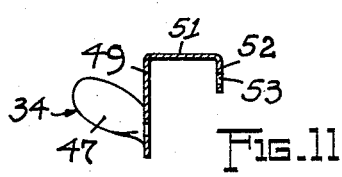
Fig. 11 is a sectional view on line 11—11 of Fig. 8.

Referring now in detail to the exemplified form of the invention, the hand-operated seed and fertilizer spreader 2 illustrated in the drawings embodies an open top reservoir hopper 3 having laterally spaced upright end walls 4 and 5, a rounded bottom wall 6, and diverging front and rear walls 7 and 8 reenforced at their top edges by rounded flanges or beads 9. Hopper 3 is supported by carrying wheels 10 mounted on a tubular shaft 11 which is journaled in end walls 4 and 5 on an axis substantially coincident with that of rounded bottom wall 6. Shaft 11 supports the carrying wheels 10 on outwardly extended end portions, with at least one of the wheels rigidly coupled to one of the outwardly extended end portions.

Shaft 11 mounts on its central portion 12 two elongated, substantially V-shaped agitator blades 14 which include elongated, curved base portions 15 attached to shaft 11 in symmetrical relation with respect to each other and elongated wings 16 and 17 extended at right angles to each other in radial relation with respect to shaft 11.

Hopper 3 embodies on the medial line of its bottom wall 6 a plurality of rectangularly shaped, laterally spaced discharge openings 18 which are extended through said hopper from end to end parallel to end walls 4 and 5 to effect by rotation of shaft 11 with agitator blades 14 feeding of material to discharge openings 18 controlled by an elongated shutter bar 19 hereinafter to be described.

Shutter bar 19, which is preferably made of sheet material shaped to fit the outside face of rounded bottom wall 6 of hopper 3, is suspended from shaft 11 by brackets 20 pivotally suspended from shaft 11 adjacent to end walls 4 and 5 and coupled to shutter bar 19 by means of ear portions 21, 22 at opposite ends of shutter bar 19 which is shifted to predetermined positions by shutter control mechanism 23 later to be described.

Pushing of seed and fertilizer spreader 2 over ground is effected by a tubular handlebar 24 attached to hopper 3 by diverging side bars 25, 26 which have their one ends attached to handlebar 24 by bolts 27 and their other ends attached to hopper end walls 4 and 5 by bolts 28. Tubular handlebar 24 has its one end portion bent to form a supporting leg 29 and its upper end curved downwardly to provide a handgrip portion 30 with a rubber sleeve 31.

The thus constructed handlebar 24 supports on its upper end shutter control mechanism 23 which is secured to handlebar 24 by a bolt-like member 32 extended through bores 33 in said handlebar. This shutter control mechanism 23 consists of an operating lever 34 pivotally mounted on a base plate 35 cooperating with an adjusting plate 36 in limiting pivotal shifting of lever 34 to predetermined angular movements. Base plate 35 includes a flat portion 37 of substantially half-circular outline and a bent portion 38 which is formed to partly encircle handlebar 24 when the base plate is secured to the handlebar by bolt member 32 extended through aligned bores 39, 40 in flat and bent portions 37, 38 respectively of base plate 35 and aligned bores 33 in handlebar 24 as will be later described. Base plate 35 additionally includes a curved slot 41 symmetrically arranged in flat portion 37 of base plate 35 parallel to the peripheral edge 42 thereof and is provided with calibrations 44 arranged adjacent outer edge 43 of slot 41.

Base plate 35 seats circular adjusting plate 36 rotatably arranged with respect thereto by bolt member 32 which is extended through axial perforation 45 of disk 36. This disk includes a slot 46 aligned with curved slot 41 of base plate 35. This slot 46 is longer than curved slot 41, thus permitting substantial rotation of adjusting disk 36 with respect to base plate 35.

The superposed base plate 35 and adjusting disk 36 cooperate with lever 34 pivotally supported on bolt member 32. This lever includes a handle 47 and U-shaped working arm 48. Flange 49 of working arm 48 is extended from pivot center 50 of lever 34 and web portion 51 of working arm 48 is extended through aligned curved slots 41 and 46 of base plate 35 and adjusting disk 36 respectively. Flange 52 of U-shaped working arm 48 is provided with an aperture 53 to permit connection of lever 34 with lug 54 of shutter bar 19 by rod 55.

Shutter control mechanism 23 determines the flow of material discharged from spreader 2 by the position of shutter bar 19 and can be adjusted to effect a desired flow of material by rotary shifting of adjusting disk 36 frictionally held in engagement with base plate 35 by wing nut 56 screwed upon a threaded stud 57 on base plate 35, which stud is extended through slot 46 of adjusting disk 36. Shifting of operating lever 34 to closed position is arrested by end wall 58 of slot 41 in base plate 35, and shifting of operating lever 34 to pre-set open position is arrested by end wall 59 of slot 46 in adjusting disk 36, which preset position can be observed through window 60 in adjusting disk 36 exposing the preset calibration on base plate 35.

Figure 12:
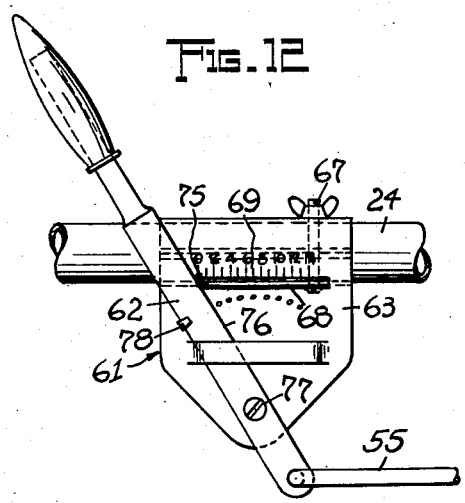
Figs. 12 through 16 show a modified form of shutter control means; thus
Figure 13:
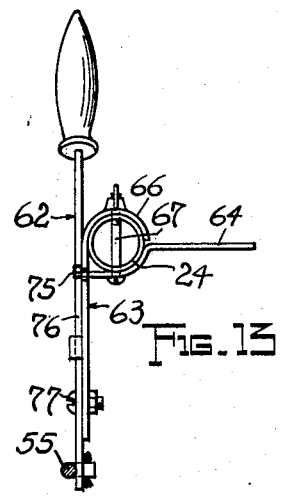
Figure 14:
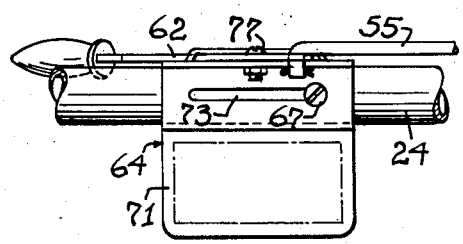
Figure 15:
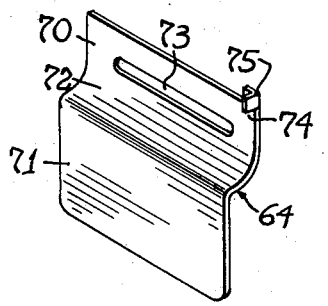
Figure 16:
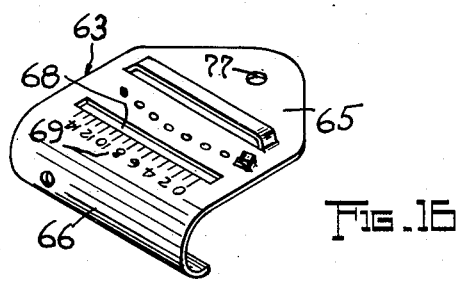

In the modified form of shutter control mechanism 61 shown in Figs. 12 through 16 operating lever 62 is controlled by two angularly related plates, to wit: a base plate 63 and a longitudinally shiftable adjusting plate 64. Base plate 63 embodies a flat portion 65 and a curved portion 66 engaging handlebar 24 and is secured thereto by bolt member 67. In addition, base plate 63 has a straight slot 68 to permit joint control of operating lever 62 by base plate 63 and adjusting plate 64 and is calibrated at 69 to indicate such control. Adjusting plate 64 extends at a right angle to base plate 63 and has two parallel flat portions 70, 71 connected with each other by curved portion 72 engaged with handlebar 24. Adjusting plate 64 includes in its flat portion 70 an elongated slot 73 aligned with bolt member 67 which extends through slot 73 and connects adjusting plate 64 adjustably to handlebar 24. In addition, adjusting plate 64 has extended from corner 74 of flat portion 70 a finger 75 aligned with slot 68 of base plate 63 and extended through said slot to provide a stop for operating lever 62 when side edge 76 of said lever engages finger 75. Operating lever 62 is pivoted to base plate 63 at 77 and is arrested in closed position of control mechanism 61 by stop 78 on base plate 63, whereas in preset open position of the control mechanism 61 operating lever 62 is arrested by finger 75 of adjusting plate 64, which finger indicates the preset open position of the mechanism in calibrated portion 69.

Having thus described my invention, what I claim is:
What I claim is:

1. In a material spreading apparatus having a wheeled hopper and shutter-controlled discharge means for the hopper, actuating means for the shutter of the shutter-controlled discharge means, said actuating means embodying a base member rigidly secured to said apparatus and provided with a slot forming a circular arc, an arresting member rotatably adjustably secured to said apparatus in axial alignment with the center of the circular arc of said slot and provided with a slot forming a circular arc aligned with the slot of said base member, and operating lever means for the shutter of the shutter-controlled discharge means, said operating lever means being pivotally supported in alignment with the centers of said circular arcs and including a lever arm extended through the slots in said base member and said arresting member to be limited to predetermined arcuate movements by end walls of said slots.

2. A material spreading apparatus as described in claim 1, wherein the base member includes adjacent the arcuate slot thereof calibrations, and wherein the arresting member adjacent one end of its arcuate slot includes a window to indicate the adjusted position of the arresting member with respect to the base member.

3. In a material spreading apparatus having a wheeled hopper with a handle member and shutter-controlled discharge means for the hopper, actuating means for the shutter of the shutter-controlled discharge means, said actuating means embodying a base member with a bent part partly encircling the handle member and secured thereto by elongated bolt means extended through aligned holes in the handle member and a flat part of half-circular shape having a peripheral edge concentric with the elongated bolt means, a slot in said base member forming a circular arc arranged concentrically with respect to the peripheral edge of the base member, a rotatably adjustable arresting member rotatably supported on said bolt means, a slot in said arresting member forming a circular arc aligned with the slot in said base member, and operating lever means for the shutter of the shutter-controlled discharge means, said operating lever means being pivoted on said bolt means and including a lever arm extended through the slots of said base member and said arresting member to be limited to predetermined arcuate movements by end walls of said slots.

References Cited in the file of this patent
UNITED STATES PATENTS

| | | |
|---|---|---|
| 2,626,083 | Masters | Jan. 20, 1953 |
| 2,735,582 | Wilson | Feb. 21, 1956 |